United States Patent [19]
Conner

[11] Patent Number: 4,600,514
[45] Date of Patent: Jul. 15, 1986

[54] CONTROLLED GEL TIME FOR SOLIDIFICATION OF MULTI-PHASED WASTES

[75] Inventor: Jesse R. Conner, Atlanta, Ga.

[73] Assignee: Chem-Technics, Inc., Atlanta, Ga.

[21] Appl. No.: 532,615

[22] Filed: Sep. 15, 1983

[51] Int. Cl.$^4$ .................................................. C02F 1/52
[52] U.S. Cl. ............................. 210/751; 106/74; 106/76; 106/84; 405/129
[58] Field of Search ....................... 106/74, 76, 84; 210/727, 728, 732, 724, 726, 751, 747, 660; 405/128, 129

[56] References Cited

U.S. PATENT DOCUMENTS

| | | | |
|---|---|---|---|
| Re. 29,783 | 9/1978 | Smith et al. | 210/59 |
| 1,436,061 | 11/1922 | Stryker et al. | 106/74 |
| 1,456,303 | 4/1923 | Ekstrom | 106/74 |
| 1,463,123 | 7/1923 | McAllister | 106/74 |
| 1,466,246 | 8/1923 | Parkyn | 106/74 |
| 1,470,674 | 10/1923 | Amies | 106/74 |
| 1,757,470 | 5/1930 | Peebles | 106/74 |
| 2,016,796 | 10/1935 | Brock et al. | 18/47.5 |
| 2,081,541 | 4/1937 | Joosten | 61/36 |
| 2,227,653 | 1/1941 | Langer | 61/36 |
| 2,580,409 | 1/1952 | Cornish | 210/2 |
| 2,662,022 | 12/1953 | Dietz | 106/74 |
| 2,695,850 | 11/1954 | Lorenz | 106/76 |
| 2,809,118 | 10/1957 | Keil | 106/84 |
| 3,028,340 | 4/1962 | Gandon | 252/313 |
| 3,094,846 | 6/1963 | Peeler | 61/36 |
| 3,137,564 | 6/1964 | Mark | 71/62 |
| 3,149,985 | 9/1964 | Gandon | 106/74 |
| 3,178,299 | 4/1965 | Wilborn | 106/84 |
| 3,180,098 | 4/1965 | Spencer | 61/36 |
| 3,202,214 | 8/1965 | McLaughlin | 166/30 |
| 3,226,318 | 12/1965 | Schick | 210/10 |
| 3,294,563 | 12/1966 | Williams | 106/74 |
| 3,305,894 | 2/1967 | Boden et al. | 18/12 |
| 3,306,756 | 2/1967 | Miller | 106/84 |
| 3,371,712 | 3/1968 | Adams | 166/33 |
| 3,374,834 | 3/1968 | Ramos et al. | 166/33 |
| 3,383,228 | 5/1968 | Rekate et al. | 106/84 |
| 3,411,582 | 11/1968 | Dale | 166/29 |
| 3,437,625 | 4/1969 | Bonnel et al. | 260/29.4 |
| 3,450,661 | 6/1969 | Neel | 260/29.6 |
| 3,493,406 | 2/1970 | Fillet | 106/74 |
| 3,558,506 | 1/1971 | Bonnell et al. | 252/316 |
| 3,591,542 | 7/1971 | Bonnel et al. | 260/29.4 |
| 3,615,780 | 10/1971 | Kim et al. | 106/74 |
| 3,635,742 | 1/1972 | Fujimasu | 106/287 |
| 3,642,503 | 2/1972 | Beaney | 106/38.35 |
| 3,656,985 | 4/1972 | Bonnel et al. | 106/90 |
| 3,720,609 | 3/1973 | Smith et al. | 210/59 |
| 3,741,308 | 6/1973 | Veley | 166/292 |
| 3,753,620 | 8/1973 | Minnick | 404/76 |
| 3,804,753 | 4/1974 | Baier | 210/21 |
| 3,837,872 | 9/1974 | Conner | 106/77 |
| 3,841,102 | 10/1974 | Cinner | 210/751 |
| 3,854,968 | 12/1974 | Minnick et al. | 106/109 |
| 3,855,391 | 12/1974 | Selmecz et al. | 423/242 |
| 3,859,799 | 1/1975 | Jaco, Jr. | 61/35 |
| 3,870,535 | 3/1975 | Minnick et al. | 106/118 |
| 3,883,360 | 5/1975 | Ruiz | 106/74 |
| 3,883,441 | 5/1975 | Murphey et al. | 252/301.1 |
| 3,893,656 | 7/1975 | Opacic et al. | 259/7 |
| 3,902,911 | 9/1975 | Messenger | 106/76 |
| 3,908,388 | 9/1975 | DeVries | 61/36 R |
| 3,920,795 | 11/1975 | Selmeczi et al. | 423/242 |
| 3,922,172 | 11/1975 | Crinkelmeyer et al. | 106/104 |
| 3,929,586 | 12/1975 | Siikkers, Jr. | 203/37 |
| 3,947,283 | 3/1976 | Uchikawa et al. | 106/89 |
| 3,947,284 | 3/1976 | Kitsugi et al. | 106/89 |
| 3,959,172 | 5/1976 | Brownell et al. | 252/301.1 |
| 3,970,462 | 7/1976 | Stillman | 106/38.35 |
| 3,971,732 | 7/1976 | Meier | 252/301.15 |
| 3,980,558 | 9/1976 | Thompson | 210/59 |
| 3,988,258 | 10/1976 | Curtiss et al. | 252/301.1 |
| 4,004,428 | 1/1977 | Tazawa et al. | 61/36 C |
| 4,009,116 | 2/1977 | Bahr et al. | 252/301.1 |
| 4,010,108 | 3/1977 | Gablin et al. | 252/301.1 |
| 4,012,320 | 3/1977 | Conner et al. | 210/45 |
| 4,015,997 | 4/1977 | Selmeczi et al. | 106/287 |
| 4,018,616 | 4/1977 | Sugahara et al. | 106/74 |
| 4,018,619 | 4/1977 | Webster et al. | 106/118 |
| 4,018,679 | 4/1977 | Bolsing | 210/36 |
| 4,019,628 | 4/1977 | Derby | 206/524.4 |
| 4,020,003 | 4/1977 | Steinberg et al. | 252/301.1 |
| 4,028,240 | 6/1977 | Manchak, Jr. | 210/59 |
| 4,028,265 | 6/1977 | Barney et al. | 252/301.1 |
| 4,030,939 | 6/1977 | Mallow | 106/74 |
| 4,049,462 | 9/1977 | Cocozza | 106/85 |
| 4,056,362 | 11/1977 | Gablin et al. | 23/260 |
| 4,056,937 | 11/1977 | Suzuki | 61/36 B |

(List continued on next page.)

FOREIGN PATENT DOCUMENTS

| | | | |
|---|---|---|---|
| 487701 | 5/1976 | Australia | 106/76 |
| 1009775 | 11/1972 | Canada . | |
| 1003777 | 1/1977 | Canada . | |
| 2426641 | 12/1974 | Fed. Rep. of Germany . | |
| 1246848 | 9/1971 | France . | |
| 48-13673 | 2/1973 | Japan . | |
| 50-81963 | 7/1975 | Japan . | |
| 54-124553 | 9/1979 | Japan . | |
| 442765 | 2/1936 | United Kingdom | 106/76 |
| 551701 | 3/1943 | United Kingdom | 106/76 |
| 599463 | 3/1948 | United Kingdom | 106/84 |
| 1113014 | 5/1968 | United Kingdom | 106/76 |
| 12598211 | 1/1972 | United Kingdom . | |
| 1313626 | 4/1973 | United Kingdom . | |

OTHER PUBLICATIONS

Hackh's Chemical Dictionary, Fourth Edition 1969, McGraw Hill, pp. 610, 611.
Sodium Silicate Handbook, Diamond Shamrock.

*Primary Examiner*—Ernest G. Therkorn
*Attorney, Agent, or Firm*—Jones & Askew

[57] ABSTRACT

A method of controlling the gelling time during the solidification of multi-phased liquid and semi-liquid wastes comprising admixing the waste with cement, a powdered alkali metal silicate and a liquid alkali metal silicate.

15 Claims, No Drawings

U.S. PATENT DOCUMENTS

| | | | |
|---|---|---|---|
| 4,060,425 | 11/1977 | Harada et al. | 106/90 |
| 4,072,019 | 2/1978 | Pearson | 61/36 C |
| 4,077,901 | 3/1978 | Arnold et al. | 252/301.1 |
| 4,084,981 | 4/1978 | Higuchi et al. | 106/96 |
| 4,108,677 | 8/1978 | Valiga | 106/109 |
| 4,113,504 | 9/1978 | Chen et al. | 106/97 |
| 4,116,705 | 9/1978 | Chappell | 106/90 |
| 4,118,243 | 10/1978 | Sandesara | 106/109 |
| 4,122,028 | 10/1978 | Iffland et al. | 252/301.1 |
| 4,124,405 | 11/1978 | Quienot | 106/111 |
| 4,132,558 | 1/1979 | Uchikawa et al. | 106/104 |
| 4,142,912 | 3/1979 | Young | 106/98 |
| 4,149,968 | 4/1979 | Kupiec | 210/665 |
| 4,151,940 | 5/1979 | Nuding et al. | 225/96.5 |
| 4,163,674 | 8/1979 | Been | 106/15.05 |
| 4,169,735 | 10/1979 | Boberski et al. | 106/84 |
| 4,171,986 | 10/1979 | Freyhold et al. | 106/74 |
| 4,173,546 | 11/1979 | Hayes | 252/301.1 |
| 4,174,293 | 11/1979 | Colombo et al. | 252/301.1 |
| 4,183,763 | 1/1980 | Omilinsky et al. | 106/109 |
| 4,186,089 | 1/1980 | Okada | 210/49 |
| 4,190,454 | 2/1980 | Yamagisi et al. | 106/90 |
| 4,191,584 | 3/1980 | Berry | 106/90 |
| 4,196,169 | 4/1980 | Gablin et al. | 422/159 |
| 4,208,216 | 6/1980 | Yamaguchi et al. | 106/74 |
| 4,210,455 | 7/1980 | Metcalf et al. | 106/90 |
| 4,211,572 | 7/1980 | Wagner et al. | 106/90 |
| 4,213,785 | 7/1980 | Blanc et al. | 106/38.35 |
| 4,216,022 | 8/1980 | Wilson | 106/104 |
| 4,225,359 | 9/1980 | Schneider | 106/93 |
| 4,229,295 | 10/1980 | Krofchak | 210/723 |
| 4,230,568 | 10/1980 | Chappell | 210/751 |
| 4,238,236 | 12/1980 | Falcoz et al. | 106/90 |

CONTROLLED GEL TIME FOR SOLIDIFICATION OF MULTI-PHASED WASTES

TECHNICAL FIELD

This invention relates in general to waste treatment and specifically relates to a method for solidification of multi-phased wastes.

BACKGROUND

The process of hazardous or offensive waste materials produced by municipalities and industries has reached critical importance in modern-day society. Concern for the quality of life and the environment have compelled governmental agencies to promulgate legislation to insure that future generations will not suffer from the excessive wastes of our present day society. Under the regulations which implement these governmental edicts, waste must be discarded in a fashion which is non-offensive and presents little or no threat to the air, water and land upon which the waste is ultimately disposed. The United States Congress in 1976 enacted Subtitle C of the Resource Conservation and Recovery Act (RCRA), Public Law 94-580, for the purpose of instituting a national hazardous waste control program similar in function to the previously promulgated Air Pollution and Water Pollution Control programs.

The United States Environmental Protection Agency, charged with the responsibility for implementing and supervising the hazardous waste control program called for under RCRA, promulgated in 1980 a series of regulations which require that certain sludges, slurries and other liquid wastes containing specified hazardous materials may no longer be deposited in landfills without pre-treatment, stabilization, and dewatering. Wastes must additionally have acceptable toxicity levels as measured by certain established tests before they can be discarded in a landfill. One primary objective of these governmental requirements is to achieve a non-flowing consistency of the waste by reduction of the liquid content or increase of the solid content to eliminate the presence of free liquids prior to final disposal in the landfill. The end result of this and other similar legislation and regulations is that many liquid or semi-liquid wastes containing hazardous materials will require dewatering, chemical fixation, solidification, or some combination thereof, prior to ultimate disposal.

Chemical fixation and solidification processes have found recent favor for detoxifying hazardous materials and for producing solid wastes having physical properties suitable for ultimate disposal in landfills, ocean dumping, etc. For example, U.S. Pat. No. 3,837,872 discloses a method for treating liquid wastes by adding an aqueous solution of an alkali metal silicate and a silicate setting agent, which converts the waste into a chemically and physically stable solid product. The patent to Thompson, U.S. Pat. No. 3,980,558, discloses a method for treating liquid wastes by adding a solidification agent consisting essentially of hydraulic cement.

The terminology of chemical fixation and solidification has not been consistent in the prior art due primarily to the fact that until recently most of the waste treatment systems offered were considered proprietary. Such terms as "encapsulation", "crystal capture" and "pseudo mineral" often appear in the prior art instead of discussions concerning the operations of such systems, most likely because the actual chemical reactions involved are complex and not completely understood.

There is also a tendency in the prior art to confuse the terms "chemical fixation", "stabilization" and "solidification". "Stabilization" is essentially a pretreatment process which alters wastes to prevent further chemical reactions, e.g., the use of lime in biological sludges to kill or inactivate micro-organisms so that the sludge will not undergo further biological decomposition. "Chemical fixation" refers to the chemical technology used to destroy, de-toxify, immobilize, insolublize, or otherwise render a waste component less hazardous or less capable of finding its way into the environment. The term often denotes a chemical reaction between one or more waste components in a solid matrix, either introduced deliberately or preexisting in the waste. For example, the ion exchange of heavy metals within the alumino silicate matrix of a cementitious solidification agent is a chemical fixation. There is a wide variety of chemical fixation techniques known in the art for preparing waste residues for solidification, encapsulation or disposal without solidification.

The term "solidification" is the transformation of a waste residue into a solid physical form which is more suitable for storage, burial, transportation, ocean disposal, or re-use in processes such as highway paving or topping for a landfill. Solidification may reduce the hazard potential by means of creating a barrier between the waste particles and the environment, limiting permeability of the waste to water, or reducing the affected surface area of the waste available for diffusion. There are various types of solidification known in the art which do not incorporate chemical fixation. Moreover, the solidification of waste does not always involve a chemical process, e.g., drying, dewatering and filtration are physical processes which are sometimes considered "solidification".

Conventinal chemical fixation and solidification techniques sometimes do not adequately treat wastes. Generally, these prior art fixation and solidification techniques are unsuitable for sludges and slurries containing a low percentage of solids, for example, less than 10% to 20% by weight. Dewatering processes frequently cannot achieve a true solid and are sometimes subject to reversion to the original state by the simple addition of water. Pure absorption processes such as the addition of clays or lime suffer also from the problem of reversion to the original state. Moreover, in some wastes, the absorbed liquid phase of the waste can be sqwueezed out of the "solidifified" material under mechanical pressure such as may occur in a landfill or even during the handling or transporting process.

The nuclear industry in the 1950's recognized the need for preventing the reversion of wastes into a liquid phase. Early methods in this industry employed simple absorption techniques such as the addition of vermiculite, or solidification by making a concrete mixture with very large quantities of Portland cement. Large quantities were required to assure that there would be no free standing water after curing of the cement. This inevitably resulted in a relatively large ration of cement to waste, and a large volume of end waste product which must be transported and disposed. Substantial volume increases can make disposal prohibitively expensive in landfills which calculate disposal prices by volume.

Moreover, the Nuclear Regulatory Commission has stated in a preliminary draft of 10 CFR Part 61 that any nuclear wastes containing liquids must be immobilized by solidification to an end product in a dry, free-standing, homogeneous, monolithic matrix which is not readily dispersable, friable, or soluble, and which contains not more than 0.5% or one gallon per container, whichever is less, of noncorrosive liquids. Under these standards, liquids that have been immobilized by only the addition of absorbent materials such as diatomaceous earth or vermiculite are not acceptable waste forms.

The cement-silicate solidification process such as disclosed in U.S. Pat. No. 3,837,872 referenced above is designed to provide a solidification waste treatment method which does not allow reversion to the liquid phase and which possesses a reduced voluem of end product. The method is usable with a wide variety of wastes including those emanating from manufacturing, metal producing operations, and the like, which contain large concentrations of toxic, polyvalent metals. This cement-silicate technology was developed primarily for use with water-based, primarily inorganic wastes with low to moderate solids content (1–30%). The technology was specifically designed for use with continuous processing equipment wherein a liquid silicate solution can be added in a controlled manner so as to control the set or "get" time. The gel time is controlled by the concentrations of cement and liquid silicate as well as the composition of the waste. In many applications, liquid silicate solidification systems have such short gel times that setting begins before the mixed waste leaves the processing equipment.

A problem with conventional cement-liquid silicate solution solidificaiton treatment processes is that the two components of the system must be added to the waste separately since pre-mixing of such waste treatment materials would result in immediate setting thereof. The rapid setting rate of a cement and liquid silicate solidification system, together with the fact that the components must be added separately, makes the system usable only with continuous processes and very difficult to use in batch waste treatment.

The use in the prior art of a dry soluble silicate instead of a liquid silicate solution together with cement for waste treatment creates a different problem. This type of waste treatment requires more time for the gel reaction to occur since the silicate must be solubilized before it can gel. During this time, some settling of the sludge may occur in batch-processing treatment facilities or in continuous processes with low flow rates or inadequate agitation. If there is settling of the sludge prior to gel, free-standing water will occur on the top of the waste, which renders the treastment incomplete and unsatisfactory.

Another problem with the conventional cement-silicate method of waste solidification is that it is sensitive to certain waste constituents which act as inhibitors or otherwise interfere with the solidification process. The interactions between the waste constituent and the chemicals are extremely complex because many different reactions occur simultaneously, especially with wastes containing a variety of reactive pollutants.

Three general classes of interactions which have been identified include (1) reactions between the sodium silicate and the waste being treated, (2) reactions between the silicate and certain reactive components such as the calcium ion of the Portland cement, and (3) the hydrolysis and hydration reactions of Portland cement itself. These reactions and the ability of the resultant end product to encapsulate and hold waste constituents are discussed more fully in U.S. Pat. No. 3,837,872, the disclosure of which is incorporated herein by reference.

Chemical waste constituents which have been identified as solidification inhibitors fall within two basic categories: inhibitors of the cement-setting reaction, and inhibitors or precipitators of the silicate or of the cement-silicate mix. Some known cement setting inhibitors include borates; phosphates; sulfide ions; sodium arsenate; sulfates in high concentrations; oil in high concentrations; certain metal salts including lead, zinc, and copper; organics in various concentrations; and very finely divided particulate matter. Inhibitors or precipitators of the silicate or of the cement-silicate mix include ammonia or ammonium compounds, active anaerobic conditions, high concentrations of aromatic organics, pH conditions less than 4, nitrates, high concentrations of metal ions, and water soluble organics.

When any of the known inhibitors or precipitators are present in the waste being treated, the gel time of the cement-silicate mix is more difficult to predict and control. Often, free-standing water will be found on the top of the solidified waste when precipitation has occurred or when settling of certain waste constituents in the sludge occurs prior to gelling or setting. This free-standing water is a significant problem in conventional alkali metal silicate-cement solidification systems since the water can contain toxic substances in solution.

Thus, solidification processes, to be effective, must prevent the separation of phases in multi-phased wastes until the viscosity (due to setting and curing) of the mixture increases sufficiently to take over this role. When the liquid waste is of low enough viscosity initially to allow rapid phase separation due to specific gravity differences in the phases (as is the case for many sludges and slurries) or immiscibility of the wastes, additives which cause a rapid gel time are usually added. Another approach uses water absorbing agents to rapidly increase the viscosity without actually gelling the waste mixture. However, in certain waste systems, this requires the addition of relatively large amounts of ehcmicals with the consequent increased volume and cost. To reduce costs, it is then necessary to revert to a rapid gel process such as Portland cement-soluble silicate. Short gellation time, less than 10–30 minutes, causes an operational problem which has plagued fast gel processes since their inception. When used in batch type mixers, expecially those of the propeller or impeller type, there is not sufficient time to mix properly and then pump the mixture from the mixture into the curing area. As a result, the process has to be conducted in a continuous or semi-continuous fashion, which is not practical for many operations.

Phase separation of wastes can be overcome by using inorganic thickening agents such as clay, diatomaceous earth, calcium, silicate, or fumed silica. However, these thickening agents increase the volume of the waste material to impractical levels. Organic compounds such as acrylic polymers, natural gums and styrene polymers can also be used to thicken the waste material and thus prevent phase separation. Use of organic compounds is impractical because of their high cost and the difficulty in dissolving the chemicals in the waste material.

SUMMARY OF THE INVENTION

Briefly described, the present invention is a method for controlling the gel-time solidification of multi-phased liquid or semi-liquid wastes by incorporating both solid and liquid silicates in the overall cement-alkali metal silicate solidifcation system. The solid silicate functions in the manner described in the above-referenced abandoned U.S. Pat. Application Ser. No. 510,152, filed June 30, 1983, the disclosure of which is incorporated herein by reference, causing relatively slow gellation times, while the liquid silicate thickens the suspension very rapidly by partial gellation. By varying the ratio of solid silicate to liquid silicate in the waste solidification procedure, the gel time can be adjusted to be rapid enough to prevent phase separation while allowing sufficient time for processing the multiphase waste material.

Accordingly, it is an object of the present invention to provide for an improved method for waste treatment.

It is a further object of the present invention to provide an improved method for solidification of multiphased liquid or semi-liquid wastes.

It is a further object of the present invention to provide a more economical method for the treatment of multi-phased liquid or semi-liquid wastes.

It is a further object of the present invention to provide a method for treating multi-phased liquid or semi-liquid wastes which produces a substantially solid end waste material having suitable physical characteristics for use in a landfill or other areas requiring relatively inert filler material.

It is a further object of the present invention to provide a method for treating multi-phased liquid or semi-liquid wastes in which the gel time can be controlled to prevent the separation of phases while allowing sufficient time to process the waste.

It is a further object of the present invention to provide a method for in-process adjustments to be made for observed or measured changes in the composition or propoerties of the waste during treatment operations.

These and other objects, features and advantages of the method of the present invention will become apparent after a review of the following detailed description of the disclosed embodiments and the appended claims.

DETAILED DESCRIPTION OF THE PREFERRED EMBODIMENT

Chemical fixation and solidification processes, to be effective, must prevent the separation of phases in multi-phased wastes until the viscosity of the mixture increases sufficiently due to curing to take over this role. This situation occurs when the liquid waste is of low enough viscosity initially to allow rapid phase separation due to specific gravity differences in the phases, as is the case for many sludges and slurries. One way to avoid phase separation is by formulating a solidification system with a rapid gel time.

The present invention solves the problem of waste phase separation in a very cost effective and operationally efficient manner by incorporating both solid and liquid silicates in the solidification formula. In many cases, use of only solid silicates in the cement-silicate solidification system will not prevent phase separation due to the relatively long gellation time. Use of liquid silicates alone is not satisfactory because the small amount used (generally less than 5% by volume) will not cause the mixture to cure and harden properly. The solid silicate is required to harden the mixture.

Sodium silicate, or silicate of soda, another name sometimes used, is a generic term given to a family of chemicals composed of sodium oxide ($Na_2O$), and silica ($SiO_2$) and usually but not always, water ($H_2O$). The proportion of $Na_2O$ to $SiO_2$ in sodium silicates is expressed on a ratio basis. For silicates less alkaline than the metasilicate (1 molecule of $Na_2O$ to 1 molecule of $SiO_2$), the ratio is commonly expressed on a weight basis with the $Na_2O$ held at unity. For instance, the ratio of liquid sodium silicate containing 13.70% $Na_2O$ and 29.40% $SiO_2$, or twice as much $SiO_2$ as $Na_2O$, would be expressed as $Na_2O:2.00:SiO_2$, weight ratio or occasionally simply "2.00 weight ratio." On the other hand for metasilicate and more alkaline silicates, it is convenient to express the ratio on a molecular basis with the $SiO_2$ held at unity. For example, the ratio of sodium orthosilicate is given as $2Na_2O$ and $SiO_2$ mole ratio. Since the molecular weights of $Na_2O$ and $SiO_2$ are close, (62 and 60, respectively) there is only a small difference between the weight ratio and molecular, or mole ratio, for a particular sodium silicate.

The primary requirement for a powdered soluble silicate for use in the present invention is that it dissolve in water at ambient temperatures and pressures. Suitable soluble sodium silicates ($SiO_2:Na_2O$) are usually manufactured by fusing soda ash (sodium carbonate) and silica sand to form a glass, then crushing the glass to a fine powder. This results in an anhydrous product having relatively low ratios of $SiO_2:Na_2O$, such as less than 2:1. Ratios of $SiO_2:Na_2O$ as high as 3.22:1 are virtually insoluble in water at normal temperatures and pressures and must be formed by dissolving the chemicals in high pressure steam to make sodium silicate solutions which are spray dried to yield a hydrated, water soluble powder. The optimal concentrations of powdered soluble silicate used in the present invention ranges from 0.01 pounds/gallon of waste up to 1.0 pounds per gallon.

Commercial soluble powdered silicates suitable for use in the present invention include grade Uniflo 26 sodium metasilicate, pentahydrate, manufactured by Diamond Shamrock Corporation of Cleveland, Ohio, having a ratio of $SiO_2:Na_2O$ of 1.99:1 and a percentage of water of 42%; special grade S-25 anhdrous sodium metasilicate also manufactured by Diamond Shamrock Corporation having a $SiO_2:Na_2O$ ratio of 1.95:1 and a percentage of water less than 1%; and grade G hydrous sodium silicate manufactured by Philadelphia Quartz Company of Valley Forge, Pa., having a percentage of water of about 19%.

The commercial grades of liquid sodium silicate are usually made as concentrated as can be conveniently handled. For example, a silicate having a 3.22 weight ratio can be handled up to a solids content of about 39.8% equivalent to approximately 43° Baume (viscosity). This ratio silicate rapidly becomes more viscous as the concentration is further increased and is too thick to be conveniently handled at ordinary temperatures. The preferred grade of liquid silicate for the present invention is Grade 40 (Diamond Shamrock Corporation, Cleveland, Ohio) or its equivalent. Grade 40 has a weight ratio of $Na_2O3.22SiO_2$ with a solids content of 38.3%. The optimum solids content range used in the present invention is between 10% and 45% by weight. The optimum concentration range of soluble silicate used in the present invention is between about 0.1% and 10% by volume.

Cement can be used as a solidification agent with the present invention. The cement used is preferably a Portland cement since it has been found that such cements give the best results. Any of the various grades categorized as Portland cement can be successfully used, but generally type I is preferable because it is the most widely available and lowest cost cement. Other grades may be used either for cost or availability reasons in specific situations or where the other grades may perform better with a specific waste by actual testing.

In some cases, the addition of a dry water absorbent material will enhance the solidification process used in conjunction with the present invention. Water absorbent materials include particular types of clays such as Kaolinite, grade Barden manufactured by I. M. Huber Company of Huber, Ga., having a fineness of 325 mesh (94%); type Bentonite (sodium, grade High-Gel, manufactured by American Colloid Company of Skokie, Ill., having a fineness of 200 mesh (65%); type Montmorillonite (calcium), grade Ren-Fre GBW, manufactured by Oil Dri Corporation of Chicago, Ill., having a fineness of 200 mesh (80%); and type Attapulgite, grade Attage 40, manufactured by Engelhard Minerals and Chemicals Corporation of Edison, N.J., having a fineness of 0.14 microns. Specific types of non-clay water absorbent materials may be useful with the present invention and include diatomaceous earth, type Celatom MN41, manufactured by Eagle Picher Corporation, Cincinnati, fumed silica, type Cab-O-Sil, manufactured by Cabot Corporation, Tuscola, Ill.; acrylic polymer, type Permasorb 29, manufactured by National Starch and Chemical Corp., Bridgewater, N.J.; styrene polymer, type Imbiber Beads, manufactured by Dow Chemical Company, Midland, Mich.; natural gum, type Guar Gum, manufactured by Meer Corporation, North Bergen, N.J.; organo-aluminum compounds, type aluminum isoproopylate, manufactured by Cattem Chemicals, Chattanooga, Tenn.; and cellulosics, type Cellosize, manufactured by Union Carbide Corporation, Danbury, Conn.

The balance between phase separation or setting of wastes and gellation is critical with cement-soluble silicate treatment systems. If gellation occurs too slowly and settling or phase separation occurs too rapidly, water excretion will occur on top of the solid. If gellation occurs too rapidly, operational problems with handling the waste emerge. Therefore, the present invention provides the surprising result that the gellation time can be easily controlled.

The present invention is relatively inexpensive when compared to a solidification system that uses only a solid alkali-metal silicate and has the ability to optimally adapt the geling time to a particular combination of multi-phased liquid or semi-liquid wastes. The amount of liquid silicate used will depend on the type of waste being treated, temperature, and the desired viscosity increase. The system is very easy to control and to tailor to various types of mixers and waste handling equipment. It provides a totally new way to custom formulate the most economical and efficient solidification system for each particular waste stream. Also, it allows in-process adjustments to be made for observed or measured changes in the composition or properties of the waste during treatment operations.

EXAMPLE 1

The waste used in these examples was a mixture of one part rinse water sludge to one part caustic cleanup waste, both from a paint manufacturing plant. The rinse water sludge contained water-base paint pigments, resins and other paint constituents from the waste water treatment process. It had a pH of 7.8, specific gravity of 1.08, moderate viscosity, and was considered hazardous due to leaching of metals, including barium, chromium and lead. The caustic waste were from the caustic (sodium hydroxide solution) cleaning of paint making equipment. It contained pigments, resins and other paint constituents, had a pH of about 13, specific gravity of 1.0, and low viscosity. It was considered hazardous because of high pH. It was decided that the wastes had to be treated as a mixture, whereby the combined pH would be below 12.5, eliminating the hazardous property of "corrosivity" without requiring the use of a neutralizing acid.

Diamond Shamrock Liquid Sodium Silicate (Cleveland, Ohio) Grade 40 was used in these examples. The stock solution of sodium silicate Grade 40 had the following physical and chemical characteristics.

Specific gravity: 1.401
Weight ratio: $Na_2O:3.22:SiO_2$
Weight per gallon: 11.67 pounds
Solids content: 38.3%

Liquid silicate stock was added to the following mixture in the percentages indicated: 0.93 lb/gal Portland cement+0.13 lb/gal sodium metasilicate Grade S-25+0.26 lb/gal Barden grade kaolin. The minimum gel time for the above wastes after addition of the liquid silicate stock solution is shown in the following table.

TABLE I

| Percent liquid silicate | Gel time |
|---|---|
| 1.0% | 40 min |
| 1.5% | 15 min |
| 2.0% | 5 min |
| 4.0% | 20 sec |

EXAMPLE 2

The same waste material used in example 1 was evaluated in this example.

In all of the following tests, the samples were evaluated at one day, at 3 to 5 days, and at 10 to 14 days for unconfined compressive strength as measured with the Model CL700 Pocket Penetrometer, manufactured by Soiltest, Inc., Evanston, Ill. They were also subjectively evaluated as being soft, firm, or hard. Chemical costs are reported in cents per gallon of as-received waste prior to treatment.

The mixed wastes (50 ml samples) were treated with the solidification formulations shown.

Solidification Agent

A. 1.33 lb./gal. Portland cement+4% by volume of sodium silicate solution, Grade "N"
B. 0.67 lb./gal. Portland cement+0.67 lb./gal. sodium metasilicate Grade S-25+0.67 lb./gal. Barden grade Kaolin.
C. 0.93 lb./gal. Portland cement+0.13 lb./gal. sodium metasilicate Grade S-25+0.26 lb./gal. Barden grade kaolin+1% by volume sodium silicate solution, Grade "40" (Diamond Shamrock Corporation).

The results of the tests are summarized in Table II.

TABLE II

| Solidification Agent | Gel time | Hardness in tons/sq. ft. | | | Vol Increase (%) | Cost Cents/gal. |
|---|---|---|---|---|---|---|
| | | 1 day | 3.5 days | 10-14 days | | |
| A | 20 sec | — | 1.5 | 2.5 Firm | 9 | 8.0 |

TABLE II-continued

| Solidification Agent | Gel time | Hardness in tons/sq. ft. | | | Vol Increase (%) | Cost Cents/gal. |
|---|---|---|---|---|---|---|
| | | 1 day | 3.5 days | 10–14 days | | |
| B | >15 min. | 0 | 0.6 | 1.2 Firm | 10 | 30.0 |
| C | >15 min. | 0 | 1.0 | 1.7 Very Firm | 8 | 10.0 |

The above example illustrates the advantages of the present invention. The economical, low volume increase cement-silicate solution system alone is un-usable because of the very short gel time (20 seconds). The most effective cement-dry silicate-clay system gives delayed gel time, good hardness and low volume increase, but costs about 30 cents per gallon for chemicals alone, making it too expensive to consider over other waste treatment systems. The present invention, as indicated in formulation C, however, gives delayed gel time, very good hardness, low volume increase, and low cost per gallon.

It should be understood, of course, that the foregoing relates only to a preferred embodiment of the present invention and that numerous modifications or alterations may be made therein without departing from the spirit and the scope of the invention as set forth in the appended claims.

I claim:

1. A method of controlling the gelling time during the solidification of liquid and semi-liquid wastes, comprising the steps of:
   admixing the waste with cement, a powdered alkali metal silicate, and a liquid alkali metal silicate in relative quantities sufficient to cause the admixture to gell and set to a sedentary mass,
   the relative proportion of said powdered alkali metal silicate to said liquid alkali metal silicate being selected to cause the admixture to gel within a predetermined time; and
   thereafter allowing the admixture to set to a sedentary mass.

2. The method of claim 1, further comprising the step of admixing a dry water absorbent material having fine particles, said particles having high surface area.

3. The method of claim 2, wherein said water absorbent material is selected from the group consisting of clay, diatomaceous earth, calcium silicate, fumed silica, acrylic polymers, styrene polymers, natural gums, organo-aluminum compounds, and cellulosics.

4. The method of claim 1, wherein said cement comprises Portland cement.

5. The method of claim 1, wherein said powdered alkali metal silicate comprises sodium metasilicate.

6. The method of claim 1, wherein said liquid alkali metal silicate comprises a sodium silicate solution.

7. The method of claim 6, wherein said sodium silicate solution is between about 1% to about 45% sodium silicate by weight in water.

8. The method of claim 1, wherein the amount of said liquid alkali metal silicate added to the waste is between about 0.1% and 10% by volume.

9. The method of claim 1, wherein the amount of said powdered alkali metal silicate added to the waste is between about 0.01 pound per gallon of waste and about 1 pound per gallon of waste.

10. The method of claim 1, wherein the gel time of the admixture is increased by increasing the proportion of powdered alkali metal silicate to the liquid alkali metal silicate.

11. The method of claim 1, wherein the gel time of the admixture is decreased by decreasing the relative proportion of powdered alkli metal silicate to liquid alkali metal silicate.

12. The method of claim 1, wherein the waste is aqueous.

13. The method of claim 12, wherein the waste is multi-phased, whereby phase separation is prevented.

14. The method of claim 1, wherein the waste is non-aqueous, and further comprising the step of admixing with the waste water in an amount sufficient to cause the admixture to set to a sedentary mass.

15. The method of claim 1, wherein the powdered alkali metal silicate and the liquid alkali metal silicate are added to the waste substantially simultaneously.

* * * * *